United States Patent [19]

Shimizu

[11] Patent Number: 4,588,264
[45] Date of Patent: May 13, 1986

[54] MICROSCOPE OBJECTIVE LENS

[75] Inventor: Yoshiyuki Shimizu, Miura, Japan
[73] Assignee: Nippon Kogaku K. K., Tokyo, Japan
[21] Appl. No.: 551,842
[22] Filed: Nov. 15, 1983
[30] Foreign Application Priority Data

Nov. 30, 1982 [JP] Japan .................. 57-208652
Aug. 25, 1983 [JP] Japan .................. 58-155442

[51] Int. Cl.$^4$ .............................................. G02B 21/02
[52] U.S. Cl. ................................................... 350/414
[58] Field of Search ....................................... 350/414

[56] References Cited

U.S. PATENT DOCUMENTS 4,261,654  4/1981  Rybicki ............................... 350/414
4,403,835  9/1983  Ushida ................................ 350/414

Primary Examiner—John K. Corbin
Assistant Examiner—Rebecca D. Gass
Attorney, Agent, or Firm—Shapiro and Shapiro

[57] ABSTRACT

A microscope objective lens of medium or high magnification having a great working distance and yet having an excellent imaging performance comprises, in succession from the object side, a first lens group of positive refractive power for converting a light flux from an object into a convergent light flux, the first lens group having a positive meniscus lens component having its concave surface facing the object side and a cemented lens component, a second lens group having a cemented lens component of small refractive power disposed in the convergent light flux, and a third lens group having a meniscus lens component having its convex surface facing the object side and a succeeding negative lens component. The objective lens satisfies the following conditions:

$$|r_1| > |r_2| > f$$

$$3f > \tfrac{1}{2}|r_1| > d_1$$

$$d_F + d_A > d_R$$

where $r_1$ and $r_2$ are the radii of curvature of the object side and image side lens surfaces, respectively, of the positive meniscus lens component in the first lens group which is most adjacent to the object side, $d_1$ is the center thickness of the positive meniscus lens component, $f$ is the focal length of the entire system, $d_F$ is the center thickness of the meniscus lens component in the third lens group which has its convex surface facing the object side, $d_R$ is the center thickness of the negative lens component, and $d_A$ is the air space between the meniscus lens component and the negative lens component.

7 Claims, 11 Drawing Figures

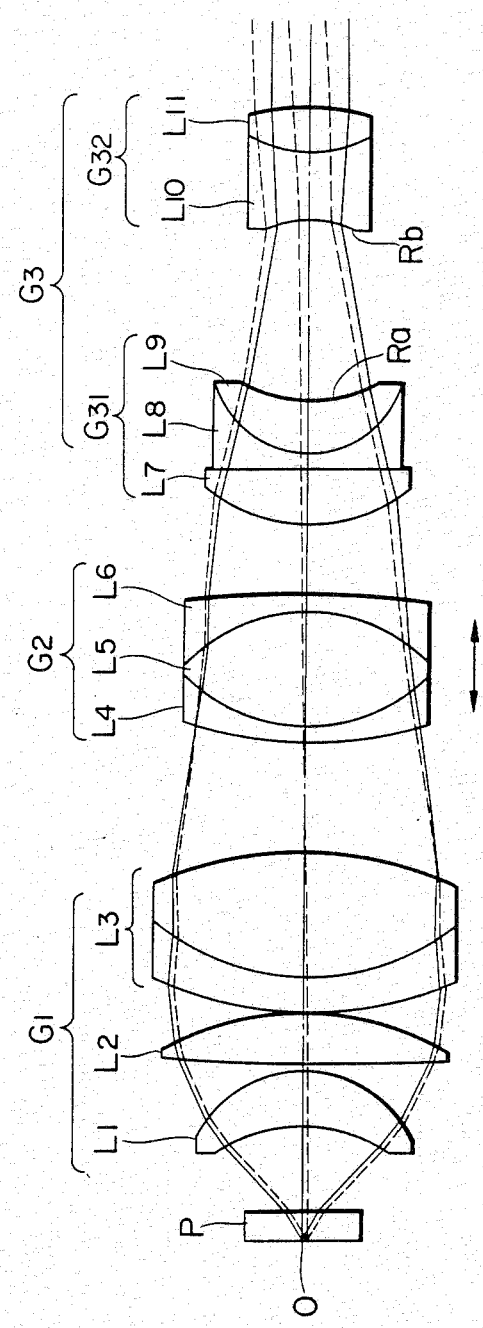

MICROSCOPE OBJECTIVE LENS

BACKGROUND OF THE INVENTION

1. Field of the Invention

This invention relates to a dry system microscope objective lens of medium or high magnification.

2. Description of the Prior Art

Heretofore, in microscope objective lenses of medium or high magnification, the working distance has generally been small and for example, in an objective lens of the order of forty times, the working distance has been 0.2–0.5 mm, and in an objective lens of the order of one hundred times, the working distance has been 0.1–0.3 mm. In objective lenses of such small working distances, the fore end thereof has been liable to touch an object to be examined during the operation of the microscope to injure the object to be examined and also, an inconvenient situation has been liable to occur during operation. Therefore, objective lenses having a high magnification and yet having a great working distance have been desired, but maintenance of the planarity of the image plane and correction of aberrations have been more difficult as the magnification becomes higher.

Also, generally, microscope objective lenses used under transmission illumination like those for biological purposes are designed on the premise that the thickness of the cover glass is a predetermined reference value and therefore, where the thickness of the cover glass differs from the reference value, the imaging performance of the objective lens is deteriorated. Such tendency becomes more remarkable as the N.A. (numerical aperture) of the objective lens is greater. For this reason, as an objective lens with a correction ring, there is known an objective lens in which the lens spacing in the objective lens is varied with a variation in the thickness of the cover glass to thereby prevent aggravation of aberrations and maintain a substantially good imaging performance. However, in the conventional popular objective lens with a correction ring, the range of aberration correction for the variation in the thickness of the cover glass is very narrow, and in the case of N.A. of the order of 0.6, the thickness range of 0.2–0.3 mm has been the practical limit.

In contrast, Japanese Laid-open Patent Application No. 142508/1981 (corresponding U.S. Pat. No. 4,403,835) discloses a technique in which a microscope objective lens comprises, in succession from the object side, a first lens group which is a positive cemented meniscus lens having its concave surface facing the object side, a second lens group which is a positive lens or a cemented positive lens and a third lens group of positive synthesized refractive power and wherein only the second lens group is moved along the optical axis in accordance with a variation in the thickness of a parallel flat plate disposed between the object surface and the objective lens, whereby a good imaging performance is maintained even if there is a wide range of variation in the thickness of the parallel flat plate. According to this technique, it is certainly possible to maintain an excellent imaging performance over a very wide range of variation in the thickness of the parallel flat plate, say, ±1.0 mm. In this technique, however, an objective lens having N.A. of the order of 0.6 and a magnification of the order of 40 times is the practical limit, and this has been insufficient as an objective lens having a greater N.A. or a higher magnification.

SUMMARY OF THE INVENTION

It is an object of the present invention to provide a microscope objective lens of medium or high magnification having a great working distance and yet having an excellent imaging performance.

It is a further object of the present invention to provide a microscope objective lens which, in spite of having a great numerical aperture and a high magnification, can always maintain an excellent imaging performance even if the thickness of a parallel flat plate such as a cover glass disposed between the object surface and the objective lens is greatly varied.

The invention will become fully apparent from the following detailed description thereof taken in conjunction with the accompanying drawings.

BRIEF DESCRIPTION OF THE DRAWINGS

FIG. 7 shows the lens construction of a fourth embodiment in which any aberration fluctuation by the cover glass can be corrected.

DESCRIPTION OF THE PREFERRED EMBODIMENTS

Figure 1:
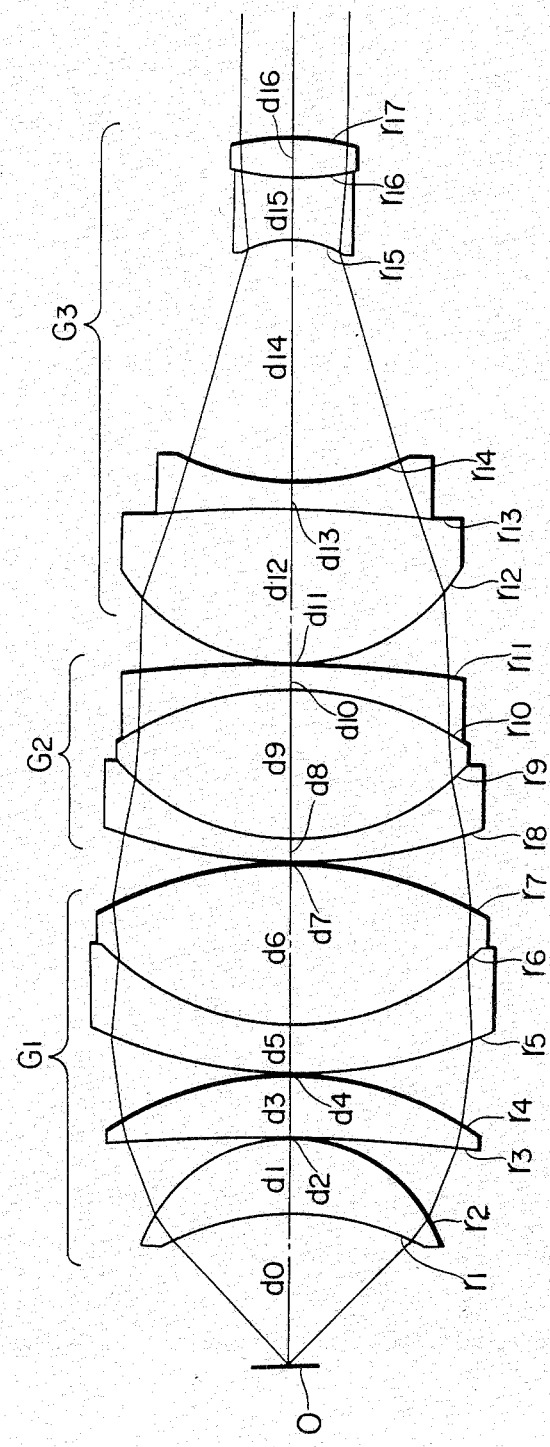
FIGS. 1, 2 and 3 show the lens constructions of first, second and third embodiments, respectively, of the present invention.

A microscope objective lens according to the present invention basically has, in succession from the object O side, a first lens group G1 of positive refractive power for converting the light flux from an object into a convergent light flux, the first lens group G1 having a positive meniscus lens component having its concave surface facing the object side and a cemented lens component, a second lens group G2 having a cemented lens component of small refractive power disposed in the convergent light flux, and a third lens group G3 of negative refractive power having a meniscus lens component having its convex surface facing the object side and a succeeding negative lens component.

The microscope objective lens satisfies the following conditions:

$$|r_1| > |r_2| > f \qquad (1)$$
$$3f > \tfrac{1}{2}|r_1| > d_1 \qquad (2)$$
$$d_F + d_A > d_R \qquad (3)$$

where $r_1$ and $r_2$ are the radii of curvature of the object side and image side lens surfaces of the positive meniscus lens component in the first lens group G1 which is most adjacent to the object side, $d_1$ is the center thickness of said positive meniscus lens component, f is the focal length of the entire system, $d_F$ is the center thickness of the meniscus lens component in the third lens group G3 which has its convex surface facing the object side, $d_R$ is the center thickness of the negative lens component in the third lens group G3, and $d_4$ is the air space between said meniscus lens component and said negative lens component.

Generally, in the conventional dry system plan objective lens having a flat image plane, a lens surface of strong negative refractive power having its concave surface facing the object is provided most adjacent to the object side. This lens surface of strong negative refractive power acts very effectively to render the Petzval sum negative and moreover, because of its being near the object, the amount of refraction of light rays in this surface is small and this surface hardly adversely affects aberrations for its strong refractive power. However, in order not to adversely affect aberrations, this lens surface need be very near the object surface and for this reason, the working distance has unavoidably been small. Usually, the lens which is most adjacent to the object side and which has such a lens surface having its concave surface of strong refractive power facing the object side has a very thick meniscus shape as compared with the radius of curvature thereof, the center thickness of this lens is substantially the same as the value of the radius of curvature of the image side lens surface of this lens having its convex surface facing the image side, and the radius of curvature of the concave surface of this lens has a value of 50–60% of that of the convex surface. The correlation between these values maintains a substantially constant rate irrespective of the magnification and numerical aperture of the objective lens and, in a dry system plan objective lens, it will be understood that such a construction of the lens which is most adjacent to the object side is requisite and has performed a great role.

In the present invention, the construction of the conventional dry system plan objective lens as described above cannot be used to secure a long working distance and therefore, a positive meniscus lens having the construction as prescribed by conditions (1) and (2) above is disposed most adjacent to the object side and, for the correction of Petzval sum which will be undercorrected thereby, a lens group of negative refractive power having the construction as prescribed by condition (3) is provided as the third lens group. Accordingly, the present invention is characterized chiefly by the constructions of the positive meniscus lens in the first lens group which is most adjacent to the object side and the third lens group.

Condition (1) above is for obtaining a long working distance and preventing extreme aggravation of Petzval sum. When the relation in magnitude between the absolute values of $r_1$ and $r_2$ shown in condition (1) is reversed, use is made of an aberration correcting technique similar to that used for the conventional objective lens described previously and therefore, it becomes basically impossible to maintain a long working distance. Also, if the absolute value of $r_2$ becomes smaller than the focal length f of the entire system, it will be advantageous for the correction of spherical aberration and chromatic aberration, but Petzval sum will be excessively great in the positive sense and will be difficult to correct.

If the left-hand sign of inequality of condition (2) is reversed, the radius of curvature $r_1$ of the lens surface which is most adjacent to the object side will become relatively too great and will therefore aggravate spherical aberration and will also make the correction of Petzval sum difficult and thus, good correction will become difficult even by the rearward third lens group. If the right-hand sign of inequality of condition (2) is reversed, the radius of curvature of the lens surface which is most adjacent to the object side will become relatively small and will therefore impart a good influence to the correction of Petzval sum, but the spherical aberration created in this lens surface will become great and moreover, it will become difficult to maintain a great working distance.

In subsequence to such a positive meniscus lens which is most adjacent to the object side, the first lens group for converting the light flux from the object into a convergent light flux need have two or three lens components and should desirably have at least one more positive meniscus lens component and one more biconvex positive lens component. It is also desirable to provide a cemented surface in at least the biconvex lens component in the first lens group to correct chromatic aberration.

The second lens group basically has the function of correcting chromatic aberration and therefore, the refractive power thereof may be small as compared with the refractive powers of the other lens groups and, to provide an apochromat objective lens, it is desirable to constitute this lens group by a well-known triplet cemented lens component.

The third lens group G3, as previously described, has a meniscus lens component having its convex surface facing the object side and a negative lens component disposed rearwardly thereof with an air space therebetween, and by condition (3) above, it causes the light flux passed through the second lens group to converge into a small light flux diameter and makes the image distance into a predetermined value and also corrects the image plane well with Petzval sum as negative. If the center thickness $d_F$ of the meniscus lens component in the third lens group G3 having its convex surface facing the object side becomes smaller, it is necessary to increase the air space $d_4$ between it and the subsequent negative lens component. To converge the light flux from the second lens group G2 by a predetermined amount, the value of the sum of the center thickness $d_F$ and the air space $d_4$ must be substantially constant and the greater is the value of this sum, the more intensely the light flux can be converged. If condition (3) is departed from, the convergence of the light flux will become insufficient and as a result, the image distance will become too long. In this case, it is possible to reduce each element of the lens system by a certain magnification to thereby reduce the full lens length including the image distance, but if this is done, the working distance will also be reduced by this magnification.

Thus, by condition (3), in the third lens group G3, the light flux from the second lens group G2 is converged into a small light flux diameter, but it is desirable that the height of the paraxial ray from the on-axis object point emergent from the third lens group G3 be about ½, preferably, in the range of ⅓–⅔, of the height at which such ray enters the third lens group.

The negative lens component rearwardly positioned in the third lens group G3 receives the light flux converged and stopped down by the meniscus lens component which is more adjacent to the object side than said negative lens component, and imparts a suitable magnification thereto and at the same time, contributes to good correction of the image plane with Petzval sum as negative.

It is possible to cause a part of the action of this negative lens component to be borne by the image side surface of the forward meniscus lens component in the third lens group G3, namely, the diverging lens surface having its concave surface facing the image side, and this is particularly effective in a case where the center thickness of the meniscus lens component is great. It is desirable to provide a cemented surface having its convex surface facing the image side in the meniscus lens component in the third lens group G3 which is adjacent to the object side and accordingly, it is desirable to constitute this lens component by cementing a biconvex positive lens and a biconcave negative lens together. It is desirable that the negative lens component in the third lens group G3 have on the object side thereof a lens surface having its concave surface facing the object side, and it is also desirable to provide a cemented surface having its convex surface facing the object side.

Where the microscope objective lens of the present invention having the basic construction as described above is used to effect a microscopic examination with a parallel flat plate such as a cover glass or a culture container disposed between an object O and the first lens group G1, the second lens group G2 is provided so as to be movable on the optical axis relative to the first lens group G1 and the third lens group G3, whereby the imaging performance deteriorated by a variation in the thickness of the parallel flat plate can be corrected. More specifically, where the thickness of the parallel flat plate P such as a cover glass or a culture container is greater than a predetermined design standard value, the second lens group G2 is moved toward the third lens group G3 and where the thickness of the parallel flat plate is smaller than the predetermined design standard value, the second lens group G2 is moved toward the first lens group G1, whereby an aberration corrected condition similar to that at the design standard value can always be maintained. To enable such aberration correction to be accomplished, it is of course necessary to provide in advance a space in which the second lens group G2 can be moved along the optical axis between the first lens group G1 and the third lens group G3.

In order that the correction as described above may be well accomplished, the aberration structure of each lens group must be as follows. The first lens group G1 is endowed with a strong converging action and a considerably great negative spherical aberration. The second lens group G2 is endowed with a positive spherical aberration which substantially offsets the negative spherical aberration created in the first lens group G1. The third lens group G3 of negative refractive power corrects the Petzval sum of the entire system and maintains the planarity of the image plane. It is desirable to provide in the third lens group G3 two lens surfaces opposed to each other with concave surfaces facing each other with an air space therebetween and correct Petzval sum by the diverging action in these two concave surfaces, but this is not essential when it is a principal object to correct spherical aberration.

With such a basic structure as the standard, spherical aberration can be varied by the second lens group G2 being moved relatively on the axis between the first lens group G1 and the third lens group G3. That is, the second lens group G2 of relatively small refractive power is positioned in the convergent light flux emerging from the first lens group G1 and therefore, if the second lens group G2 is moved more toward the third lens group G3 than the reference position thereof, the height at which the convergent light flux cuts the second lens group G2 will become lower than that at the reference position and the amount of positive spherical aberration created in the second lens group G2 will decrease. Conversely, if the second lens group G2 is moved more toward the first lens group G1 than the reference position thereof, the height at which the convergent light flux cuts the second lens group G2 will become higher than that at the reference position and the amount of positive spherical aberration created in the second lens group G2 will increase. Accordingly, spherical aberration greatly fluctuated by the thickness of the parallel flat P such as a cover glass disposed between the objective lens and the object surface is corrected by movement of the second lens group G2. That is, if the thickness of the parallel flat plate P becomes greater, positive spherical aberration is created and, to correct this, the second lens group $G_2$ may be moved toward the third lens group G3 to decrease the amount of positive spherical aberration in the second lens group G2. On the other hand, if the thickness of the parallel flat plate P becomes smaller, negative spherical aberration is created and therefore, the second lens group G2 may be moved toward the first lens group G1 to increase the amount of positive spherical aberration in the second lens group G2. Such a situation of aberration correction can be known also from the tertiary aberration coefficient of spherical aberration regarding a fourth embodiment which will be described later.

The lens construction of each lens group will now be described. As in the embodiment shown, the first lens group G1 has a considerably strong positive refractive power for converting the light flux from the object into a convergent light flux and for this purpose, it is desirable that the first lens group have at least three positive lens components. Of these lens components, the positive lens which is most adjacent to the object side need be of a meniscus shape having its concave surface facing the object side. As regards the second positive lens, it is desirable that the image side surface thereof be of sharper curvature, and it is desirable to provide a cemented surface in at least one of the three positive lenses. The second lens group G2 has a relatively weak refractive power and the function of creating spherical aberration greatly in the positive sense and therefore, as in the embodiment shown, it is formed by cementing together a negative meniscus lens convex toward the object side, a biconvex positive lens and a negative lens. The shape of the second lens group as a whole is like that of a positive lens, but the refractive index of the negative meniscus lens is higher than that of the biconvex lens and therefore, the second lens group as a whole has a weak negative refractive power. This is because the second lens group G2 is intended to have the function of correcting spherical aberration in the positive sense.

In each embodiment which will be described later, the second lens group G2 is constructed as a lens group of weak negative refractive power comprising three lenses cemented together, but it is also possible to endow the second lens group with a weak positive refractive power. As a further alternative, the second lens group may be divided into and comprised of a plurality of groups such as positive and negative lens groups.

The third lens group G3 directed chiefly to the correction of Petzval sum has a negative refractive power as a whole, but it is desirable that the forward group G31 of the third lens group have a weak positive refractive power and the rearward group have a weak negative refractive power. The concave surface Ra of the forward group G31 which is most adjacent to the image side and the concave surface Rb of the rearward group which is most adjacent to the object side function as the opposed concave surfaces in the third lens group as described previously. It is desirable that the forward group G31 of the third lens group be formed by cementing together a positive lens, a negative lens and a positive meniscus lens having its convex surface facing the object side. However, the negative lens and the positive meniscus lens cemented together in the forward group G31 form a hyperchromatic lens and therefore, the direction of this cemented surface may also be reversed. Also, it is desirable that the rearward group G32 of the third lens group be formed by cementing together a thick biconcave negative lens and a biconvex positive lens.

Some embodiments of the microscope objective lens according to the present invention will hereinafter be described in detail. First, second and third embodiments of the present invention are for use in a reflection illumination type microscope such as a metal microscope, and a fourth embodiment is for use in a transmission illumination type microscope such as a biological microscope. In the fourth embodiment, the second lens group is provided movably along the optical axis in accordance with a variation in the thickness of the cover glass.

FIG. 1 shows the lens construction of the first embodiment of the present invention. In FIG. 1, to facilitate the understanding of the function of each lens group, marginal light rays from the on-axis object point are shown. This first embodiment has a high magnification and a high numerical aperture (N.A.), i.e., a magnification of 60 and N.A. of 0.7, and yet the distance $d_0$ between the object surface and the vertex of the foremost lens surface is 1.77 times as great as the focal length of the objective lens, and this embodiment has a working distance as great as about 5 mm in practical use.

Figure 2:
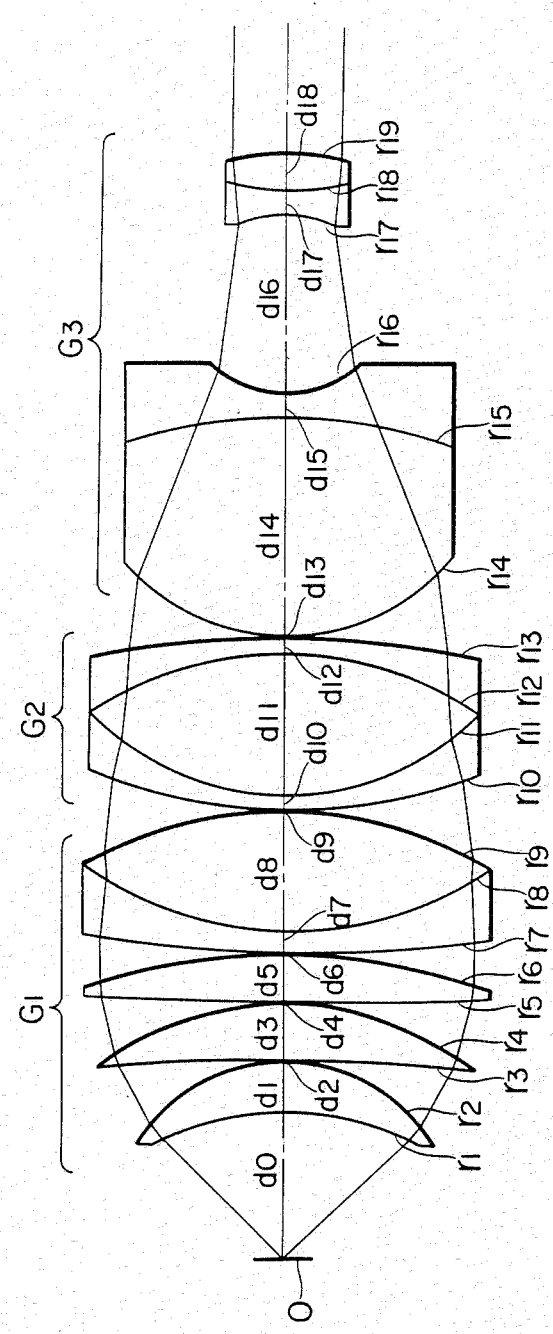

The second embodiment shown in FIG. 2 is of a construction in which a positive lens is added to the first lens group in the first embodiment. This embodiment also has a magnification of 60 and N.A. of 0.7, but the distance $d_0$ between the object surface and the vertex of the foremost lens surface is more than 1.8 times the focal length of the objective lens and in practice, this embodiment has a working distance as long as about 5 mm.

Figure 3:
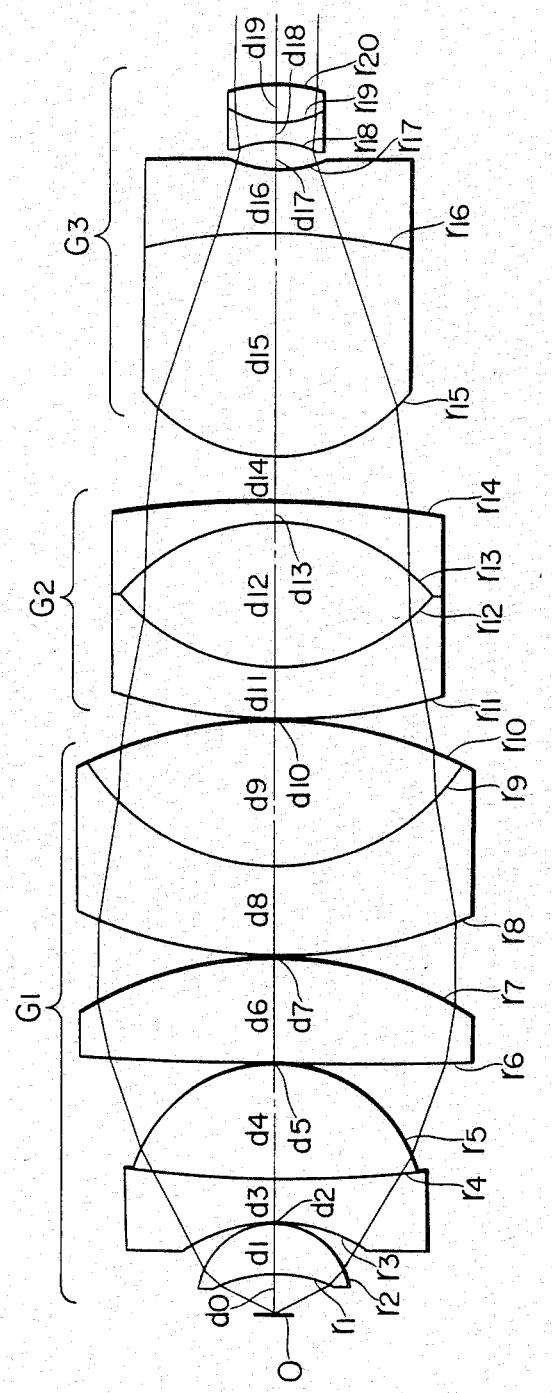

The third embodiment of FIG. 3 is a high magnification objective lens having a magnification of 100 and N.A. of 0.9 and, as compared with the construction of the second embodiment of FIG. 2, this embodiment is characterized in that the second meniscus lens component in the first lens group G1 is a cemented lens component having a center thickness greater than that of the first meniscus lens component and that the spacing between the meniscus lens component in the third lens group G3 and the subsequent negative lens component is smaller. The distance $d_0$ between the object surface and the foremost lens surface in this objective lens is 75% of the focal length and in practice, this embodiment has a very great working distance of about 1 mm as an objective lens of this magnification.

The numerical data of the above-described embodiments will be shown below.

In the tables below, the left-hand numbers represent the order from the object side, r represents the radius of curvature of each lens surface, d represents the center thickness and air space of each lens, nd represents the refractive index of each lens for d-line ($\lambda = 587.6$ nm), and $\nu$ represents the Abbe number of each lens. Also $d_0$ represents the distance between the object surface and the vertex of the foremost lens surface.

TABLE 1

(First Embodiment)
Focal length f = 1.0  N.A. = 0.7
Magnification 60  $d_0$ = 1.77360

| No. | r | d | nd | ν | |
|---|---|---|---|---|---|
| 1 | −3.2947 | 0.8020 | 1.62254 | 53.07 | |
| 2 | −1.8908 | 0.0086 | | | |
| 3 | −32.1403 | 0.7877 | 1.49805 | 82.32 | G1 |
| 4 | −3.7418 | 0.0086 | | | |
| 5 | 6.0714 | 0.5442 | 1.75716 | 31.71 | |
| 6 | 3.3514 | 1.8619 | 1.43388 | 95.57 | |
| 7 | −4.8696 | 0.0286 | | | |
| 8 | 6.5873 | 0.2864 | 1.75031 | 35.26 | |
| 9 | 2.9229 | 1.7187 | 1.43388 | 95.57 | G2 |
| 10 | −3.4367 | 0.2864 | 1.61705 | 54.13 | |
| 11 | −18.1066 | 0.0086 | | | |
| 12 | 2.3409 | 1.7616 | 1.49805 | 82.32 | |
| 13 | −19.1940 | 0.3724 | 1.71763 | 48.03 | |
| 14 | 3.7356 | 2.7785 | | | G3 |
| 15 | −1.2321 | 0.7161 | 1.74868 | 52.36 | |
| 16 | 3.3732 | 0.4297 | 1.74127 | 27.66 | |
| 17 | −3.3732 | | | | |

TABLE 2

(Second Embodiment)
Focal length f = 1.0  N.A. = 0.7
Magnification 60  $d_0$ = 1.84572

| No. | r | d | nd | ν | |
|---|---|---|---|---|---|
| 1 | −3.5289 | 0.7072 | 1.52359 | 65.12 | |
| 2 | −1.9368 | 0.0144 | | | |
| 3 | −20.3731 | 0.6929 | 1.49782 | 82.28 | |
| 4 | −3.7730 | 0.0144 | | | |
| 5 | 28.1836 | 0.6374 | 1.49782 | 82.28 | G1 |
| 6 | −6.9326 | 0.0135 | | | |
| 7 | 12.4790 | 0.2591 | 1.74950 | 35.19 | |
| 8 | 3.9457 | 1.5581 | 1.43388 | 95.57 | |
| 9 | −5.0967 | 0.0086 | | | |
| 10 | 6.2046 | 0.1710 | 1.74590 | 43.12 | |
| 11 | 3.2435 | 1.6908 | 1.43388 | 95.57 | G2 |
| 12 | −4.2575 | 0.2036 | 1.74443 | 49.46 | |
| 13 | −11.5554 | 0.0146 | | | |
| 14 | 2.4378 | 2.6760 | 1.49782 | 82.28 | |
| 15 | −5.3823 | 0.3221 | 1.61266 | 44.40 | |
| 16 | 1.3344 | 2.2086 | | | G3 |
| 17 | −1.5760 | 0.3360 | 1.71300 | 53.97 | |
| 18 | 4.4631 | 0.4336 | 1.78934 | 26.26 | |
| 19 | −3.2816 | | | | |

TABLE 3

(Third Embodiment)
Focal length f = 1.0  N.A. = 0.9

| No. | r | d | nd | ν | |
|---|---|---|---|---|---|
| 1 | −3.0820 | 0.9782 | 1.74868 | 52.36 | |
| 2 | −1.6190 | 0.0245 | | | |
| 3 | −3.5948 | 0.9196 | 1.75471 | 27.66 | |
| 4 | 21.5169 | 2.2108 | 1.49805 | 82.32 | |
| 5 | −3.0604 | 0.0489 | | | G1 |
| 6 | 185.0551 | 2.1032 | 1.61420 | 30.73 | |
| 7 | −7.1415 | 0.0245 | | | |
| 8 | 10.6872 | 1.7951 | 1.75710 | 31.70 | |
| 9 | 4.5979 | 2.8858 | 1.43388 | 95.57 | |
| 10 | −8.6080 | 0.0245 | | | |
| 11 | 15.1363 | 0.9782 | 1.75031 | 35.26 | |
| 12 | 4.2152 | 2.9347 | 1.43388 | 95.57 | G2 |
| 13 | −4.1580 | 0.3913 | 1.48743 | 70.24 | |
| 14 | −20.4677 | 0.8755 | | | |
| 15 | 3.4756 | 4.4021 | 1.49805 | 82.32 | |
| 16 | −10.7367 | 1.2717 | 1.71356 | 53.98 | |
| 17 | 1.8403 | 0.5136 | | | G3 |
| 18 | −2.0436 | 0.4158 | 1.69758 | 55.72 | |
| 19 | 2.0436 | 0.6848 | 1.61400 | 30.72 | |

TABLE 3-continued (Third Embodiment)
Focal length f = 1.0  N.A. = 0.9

| No. | r | d | nd | ν |
|---|---|---|---|---|
| 20 | −3.0819 | | | |

Figure 4:
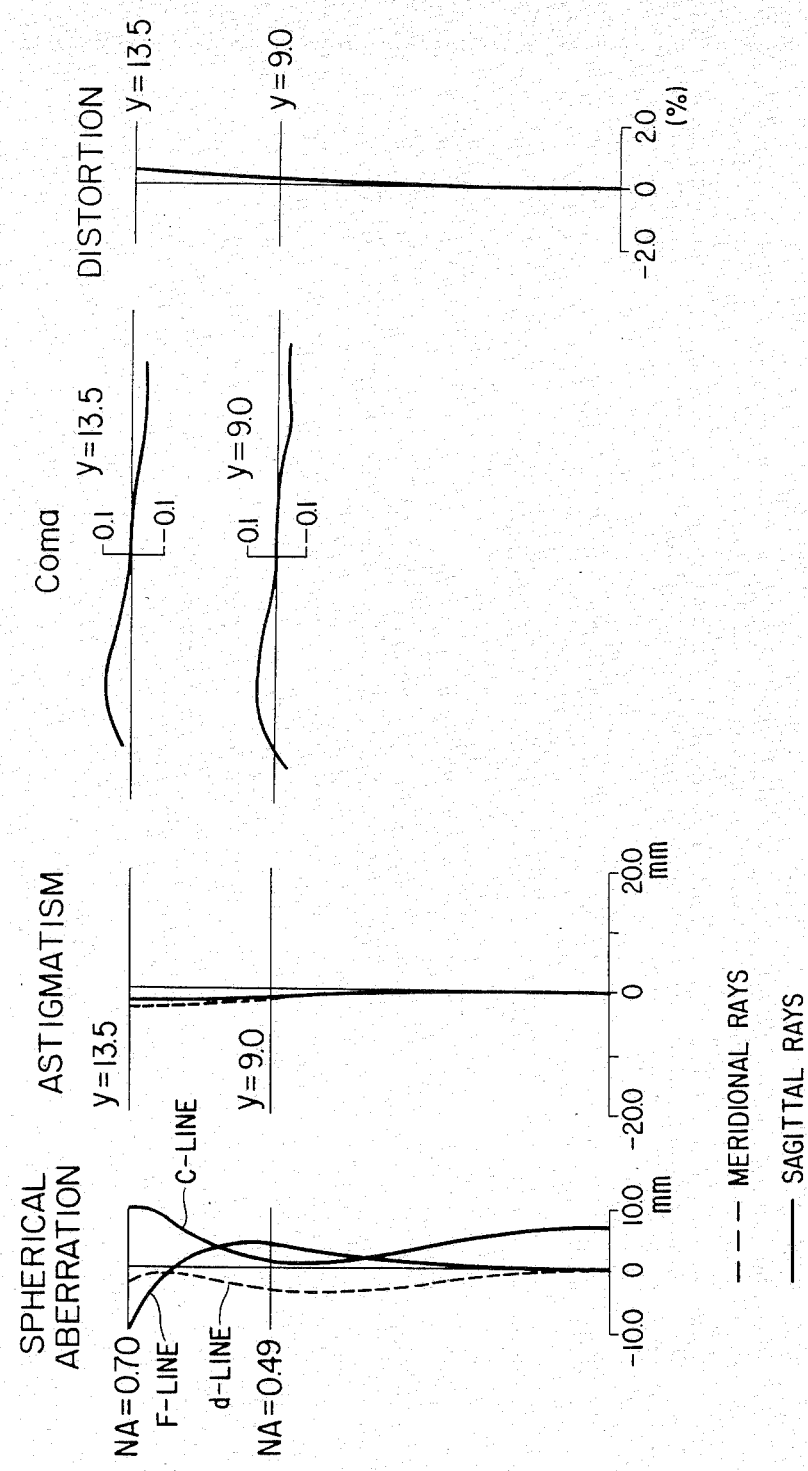
FIGS. 4, 5 and 6 show the various aberrations in the first, second and third embodiments, respectively.
Figure 5:
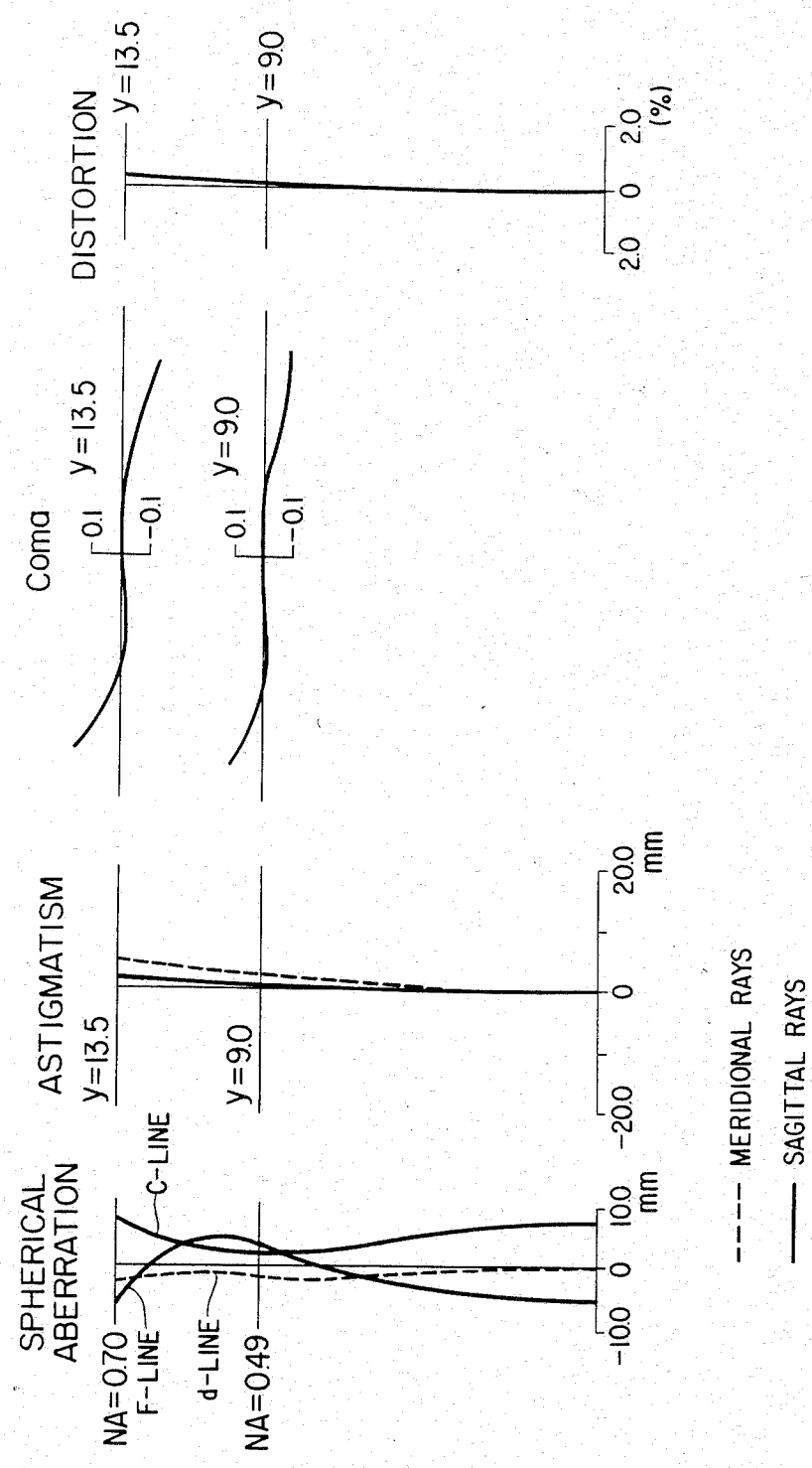
Figure 6:
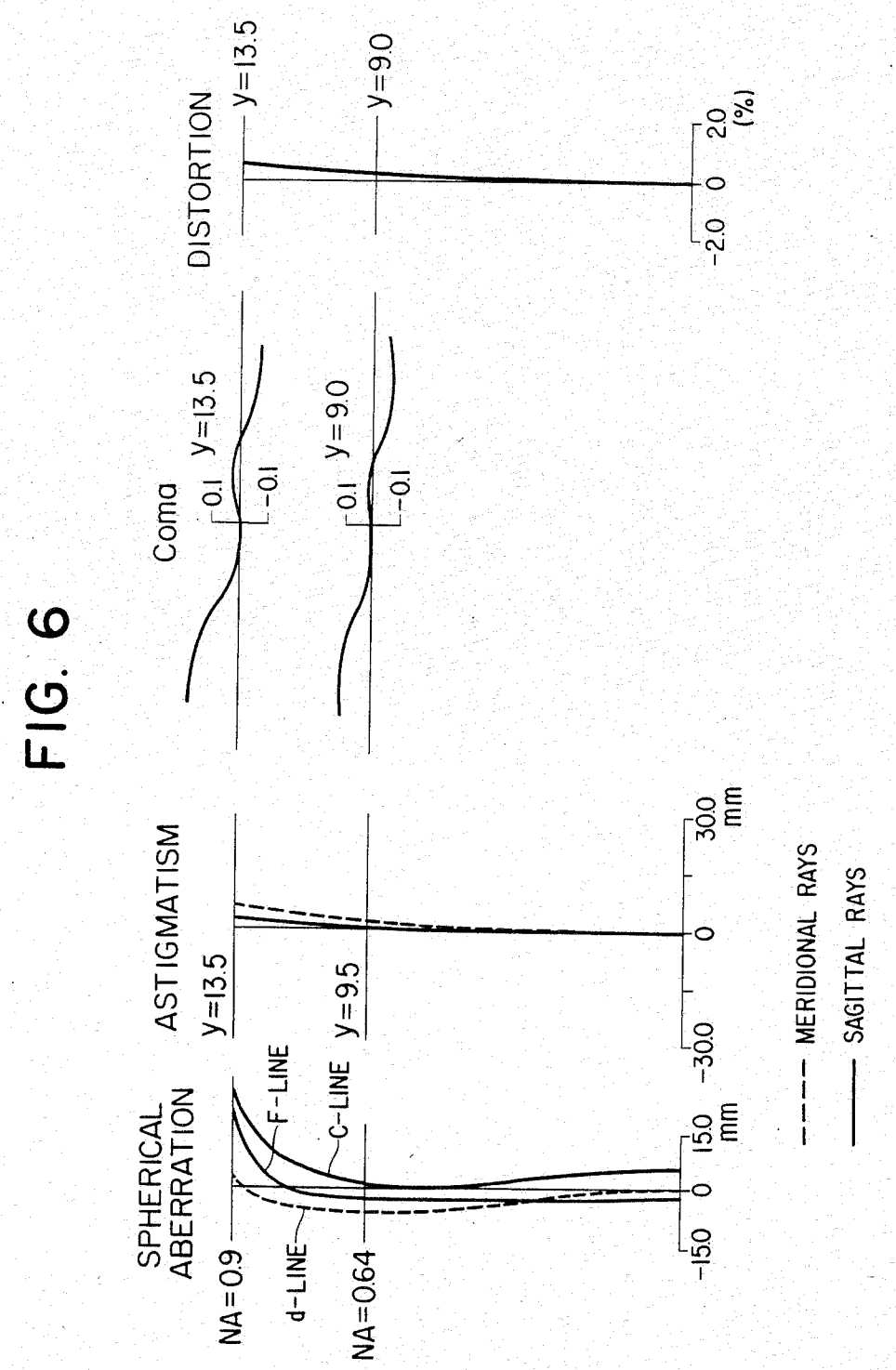

The various aberrations when the objective lenses of the first, second and third embodiments are used at their respective magnifications are shown in FIGS. 4, 5 and 6, respectively. These aberration graphs are the performance evaluations when, with respect to the objective lens of each embodiment, the full length from the object surface to the image plane is 245 mm. In these aberration graphs, the spherical aberration, astigmatism, coma and distortion for d-line ($\lambda = 587.6$ nm) are shown and, in the graph of spherical aberration, the spherical aberrations for C-line ($\lambda = 656.3$ nm) and F-line ($\lambda = 486.1$ nm) are also shown.

From these aberration graphs, it is apparent that in each exbodiment, in spite of its having a great N.A. and a great working distance, the planarity of the image plane is good and any of the various aberrations is corrected very well.

FIG. 7 shows the lens construction of a fourth embodiment of the present invention. This embodiment is an example in which the second lens group G2 may be moved relative to the first and third lens groups G1 and G3 in accordance with a variation in the thickness of the cover glass to thereby correct any fluctuation of aberrations resulting from the variation in the thickness of the cover glass. The numerical data of the fourth embodiment are shown in Table 4 below. In the Table 4, the left-hand numbers represent the order from the object side, and $d_0$ represents the distance from the vertex of the foremost lens surface of the objective lens to the surface of the cover glass.

Figure 8A:
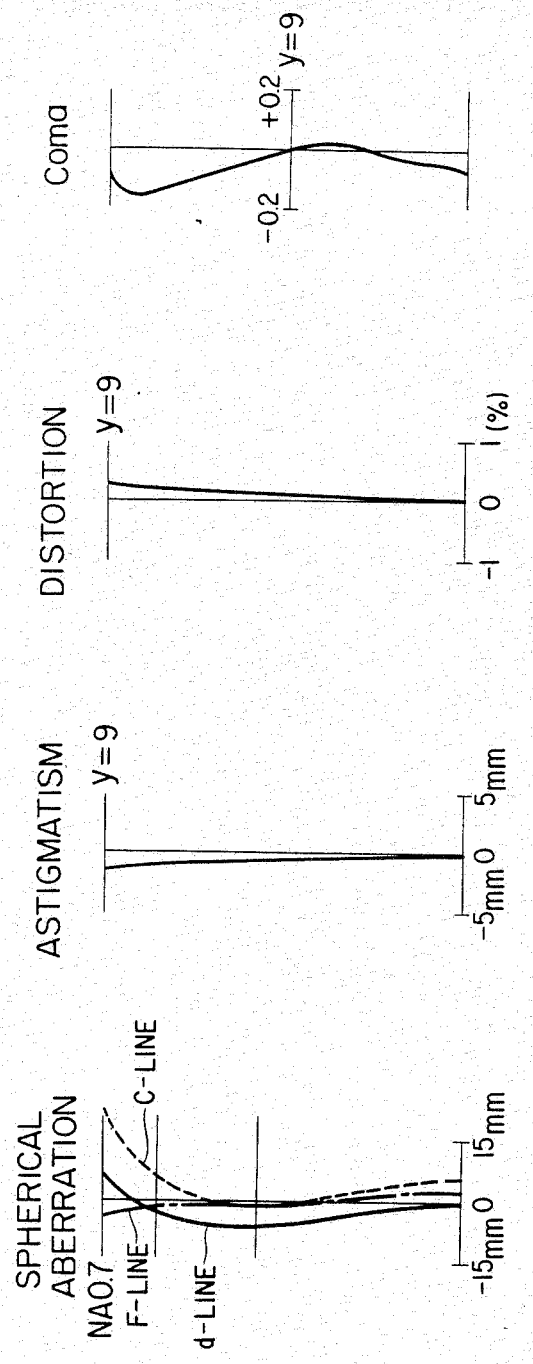
FIGS. 8A, 8B and 8C are aberration graphs which represent the result of the aberration correction effected in accordance with the thickness of the cover glass in the fourth embodiment.
Figure 8B:
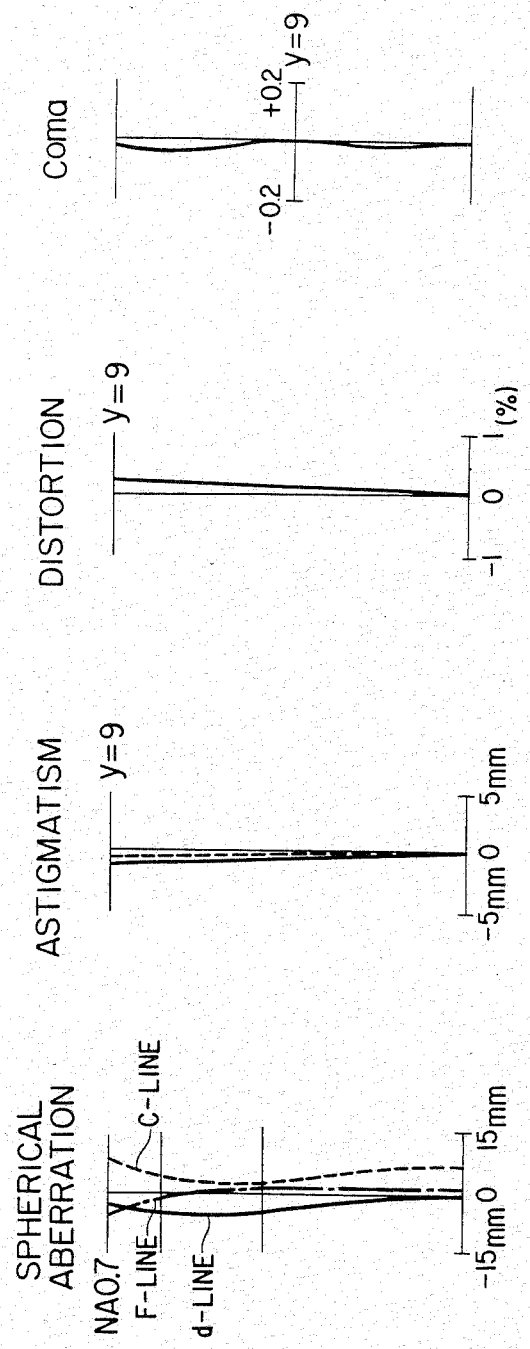
Figure 8C:
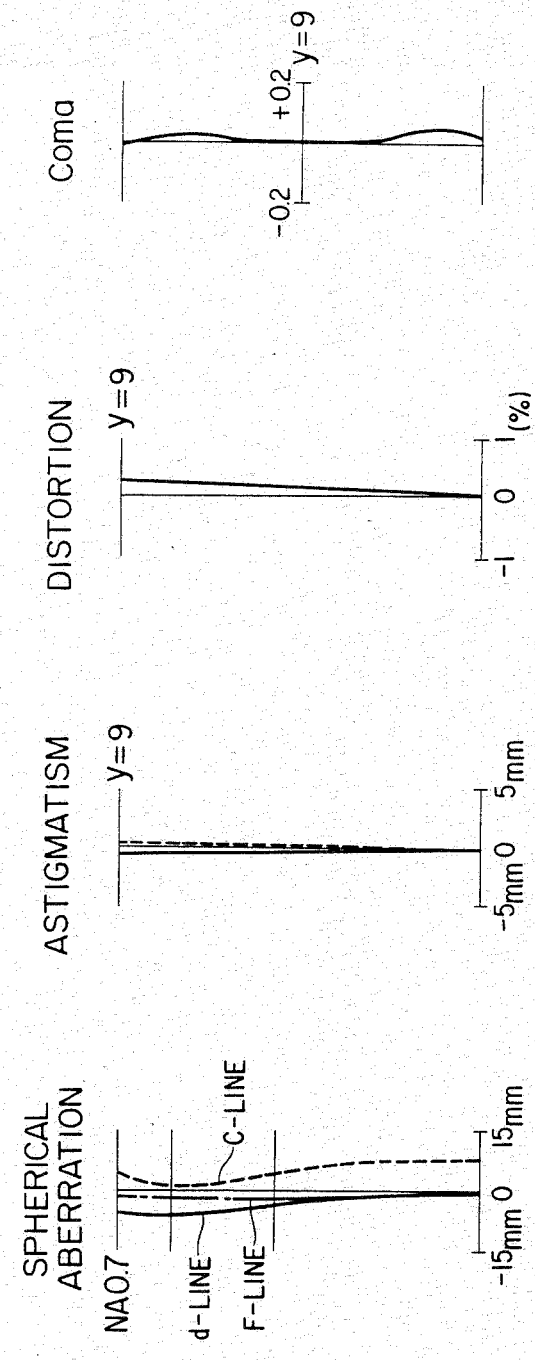

FIGS. 8A, 8B and 8C show the various aberrations when the objective lens of the fourth embodiment has been proportionally enlarged so that as a practical objective lens of a magnification of 61, f=2.64 mm, that is, the distance from the object surface to the image plane is 195 mm, FIG. 8A showing the various aberrations in a state in which the thickness of the cover glass is relatively small, say, 0.7 mm (0.2653f), FIG. 8B showing the various aberrations in the standard in which the thickness of the cover glass is 1.2 mm (0.4548f), and FIG. 8C showing the various aberrations in a state in which the thickness of the cover glass is as great as 1.7 mm (0.6443f). In these aberration graphs, spherical aberration, astigmatism, distortion and coma are shown and the standard light ray is d-line ($\lambda = 587.6$ nm), and C-line ($\lambda = 656.3$ nm) and F-line ($\lambda = 486.1$ nm) are also shown to show chromatic spherical aberration. In these Figures, the value of y represents the image height.

From these aberration graphs, it is clear that the objective lens of the fourth embodiment has a great working distance and a great numerical aperture of N.A. =0.7 and yet always maintains an excellent imaging performance over a wide range of the thickness of the cover glass, i.e., 0.7 mm to 1.7 mm.

The tertiary aberration coefficients of spherical aberration in the fourth embodiment are shown in Table 5 below. In Table 5, the coefficients in the three cases of the thickness of the cover glass shown in Table 4, and the left-hand numbers represent the order of the lens surfaces from the object side. According to Table 5, as the cover glass is thicker, the tertiary aberration coefficient of spherical aberration in the surface of the cover glass is of a greater value in the negative sense, and this endorses that the spherical aberration of the cover glass increases in the positive sense. It is apparent that even if the cover glass becomes thicker, the tertiary aberration coefficients of spherical aberration in the first G1 and

TABLE 4

(Fourth Embodiment)
Focal length f = 1.0   N.A. = 0.7
Magnification β = 61

| No. | Radius of curvature r | Center thickness and air space of each lens d | Refractive index n | Abbe number ν | | |
|---|---|---|---|---|---|---|
| | ∞ | (0.4548) | 1.52216 | 58.8 | | Cover glass P |
| | ∞ | ($d_0$ = 1.3859) | 1.0 | | | |
| 1 | −2.8310 | 0.9475 | 1.713 | 54.0 | $L_1$ | |
| 2 | −1.9995 | 0.0758 | 1.0 | | | |
| 3 | +24.7522 | 0.8527 | 1.49782 | 82.3 | $L_2$ | G1 |
| 4 | −4.5072 | 0.0379 | 1.0 | | | |
| 5 | +5.6203 | 0.5685 | 1.75692 | 31.7 | $L_3$ | |
| 6 | +3.6523 | 2.0465 | 1.43388 | 95.6 | | |
| 7 | −6.4804 | ($d_7$ = variable) | 1.0 | | | |
| 8 | +6.5565 | 0.2842 | 1.6968 | 55.6 | $L_4$ | |
| 9 | +2.8716 | 1.8191 | 1.43388 | 95.6 | $L_5$ | G2 |
| 10 | −2.8716 | 0.3411 | 1.62041 | 60.3 | $L_6$ | |
| 11 | −15.9184 | ($d_{11}$ = variable) | 1.0 | | | |
| 12 | +2.5017 | 0.9664 | 1.49782 | 82.3 | $L_7$ | |
| 13 | −142.5109 | 0.2274 | 1.71736 | 29.5 | $L_8$ | G31 |
| 14 | +1.5694 | 0.9475 | 1.713 | 54.0 | $L_9$ | |
| 15 | +3.0702 | 2.9750 | 1.0 | | | G3 |
| 16 | −1.4057 | 1.0820 | 1.713 | 54.0 | $L_{10}$ | G32 |
| 17 | +1.7331 | 0.7580 | 1.72825 | 28.3 | $L_{11}$ | |
| 18 | −3.8671 | | 1.0 | | | |

| Thickness of cover glass | $d_0$ | $d_7$ | $d_{11}$ |
|---|---|---|---|
| 0.2653f | 1.5130 | 1.2128 | 1.7812 |
| 0.4548f | 1.3859 | 1.8570 | 1.1370 |
| 0.6443f | 1.2584 | 2.6529 | 0.3411 | the third lens group G3 hardly vary, whereas the tertiary aberration coefficient of spherical aberration in the second lens group G2 varies greatly and the second lens group G2 substantially offsets the variation in the aberration coefficient in the surface of the cover glass. As a result, the tertiary aberration coefficient of spherical aberration in the entire system is a substantially constant small value even if the thickness of the cover glass is varied. This endorses that spherical aberration is always corrected well, and is well coincident with the spherical aberration graphs shown in FIGS. 8A, 8B and 8C.

TABLE 5

Tertiary Aberration Coefficients of Spherical Aberration

| Thickness of cover glass | 0.2653f | 0.4548f | 0.6443f |
|---|---|---|---|
| Surface of cover glass | −0.09260 | −0.15913 | −0.22604 |
| 1 | 0.13241 | 0.13320 | 0.13409 |
| 2 | −0.06343 | −0.06387 | −0.06435 |
| 3 | 0.31510 | 0.31600 | 0.31695 |
| 4 | 0.01821 | 0.01786 | 0.01744 |
| 5 | 0.29924 | 0.30044 | 0.30177 |
| 6 | −0.27883 | −0.27957 | −0.28036 |
| 7 | 0.14135 | 0.14064 | 0.13977 |
| 1st group G1, total | (0.56405) | (0.5647) | (0.56531) |
| 8 | 0.00097 | 0.00045 | −0.00003 |
| 9 | −0.16103 | −0.13800 | −0.11330 |
| 10 | −0.30704 | −0.26882 | −0.22710 |
| 11 | 0.01782 | 0.01629 | 0.1455 |
| 2nd group G2, total | (−0.44928) | (−0.39008) | (−0.32588) |
| 12 | 0.11800 | 0.11725 | 0.11648 |
| 13 | −0.03040 | −0.03020 | −0.03001 |
| 14 | −0.00174 | −0.00173 | −0.00172 |
| 15 | 0.00230 | 0.00228 | 0.00227 |
| 16 | −0.10465 | −0.10398 | −0.10330 |
| 17 | 0.00279 | 0.00277 | 0.00275 |
| 18 | 0.00381 | 0.00378 | 0.00376 |
| 3rd group G3, total | (−0.00989) | (−0.00983) | (−0.00977) |
| Sum total of entire system | 0.01228 | 0.00565 | 0.00362 |

Figure 9:
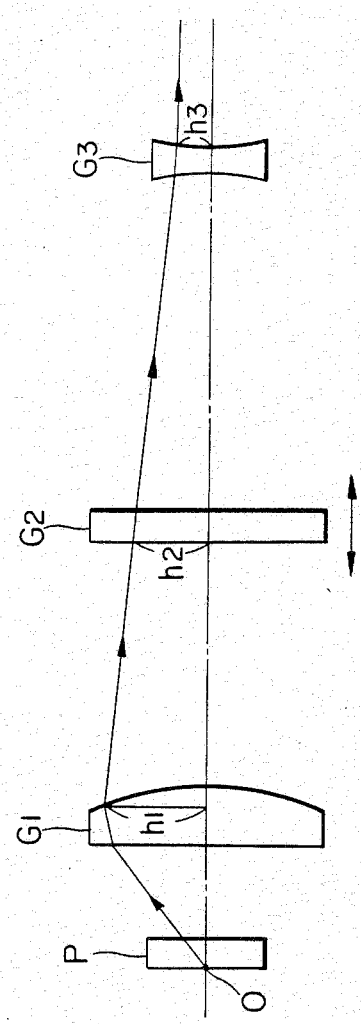
FIG. 9 shows a basic construction for effecting aberration correction by moving a second lens group in accordance with the thickness of the cover glass.

The basic characteristic of the aberration fluctuation correction by the parallel flat plate as in the above-described fourth embodiment lies in that, as already described, the light flux from the object is converted into a convergent light flux by the first lens group and the converged state of the light flux is substantially maintained even after the light flux passes through the second lens group. The light flux is condensed at a predetermined image plane position after it passes through the third lens group. Therefore, as shown in FIG. 9, the height at which the paraxial ray from the on-axis object point cuts each lens group is highest in the first lens group G1 and lower in the order of the second G2 and the third lens group G3. When the maximum values of the heights at which the paraxial ray from the on-axis object point cuts the first and second lens groups are $h_1$ and $h_2$ and the height at which the paraxial ray emerges from the third lens group is $h_3$, it is necessary that $h_1 > h_2 > h_3$. Accordingly, as regards the effective diameters of the respective lens groups, the first lens group is greatest and the third lens group is smallest, and it is desirable to construct the lens groups to such a degree that $6h_3 > h_1 > 2h_3$. Where the present invention is applied to an objective lens of higher magnification, the value of the ratio of $h_1$ to $h_3$ becomes greater, and where the present invention is applied to an objective lens of lower magnification, the value of the ratio of $h_1$ to $h_3$ becomes smaller. Also, it is desirable that the gradient of the light ray passed through the first lens group G1 have a value five to ten times as great as the gradient of the light ray passed through the entire system. This is because, as previously described, when the second lens group G2 is moved along the optical axis between the first lens group G1 and the third lens group G3, the amount of correction of spherical aberration differs depending on the height of the light ray entering the second lens group G2, and this gradient has the tendency of becoming greater for an objective lens of higher magnification and becoming smaller for an objective lens of lower magnification. Also, the construction in which the effective diameter of the first lens group is greatest is advantageous for making the working distance great.

According to the present invention, as described above, there is acheived a dry system objective lens of medium or high magnification having a great working distance and yet having an excellent imaging performance. For example, as an objective lens of 60 times, the objective lens of the present invention has a working distance of about 5 mm, and as an objective lens of 100 times, the objective lens of the present invention has a working distance of about 1 mm, and thus, the objective lens of the present invention can have a working distance about ten times as great as that of the conventional objective lens. Accordingly, the undesirable possibility that during microscopic examination, the fore end of the objective lens touches the object surface to injure the latter is reduced, and the operability is also improved very much.

Further, the object lens according to the present invention is an objective lens of high magnification having a great numerical aperture and yet suffering from less deterioration of aberration even if the thickness of the parallel flat plate such as the cover glass is greatly varied, an can always maintain a good imaging performance. Also, the refractive power of the lens group moved for aberration correction is weak and therefore, the variations in the principal point and focus position of the objective lens are slight and thus, even if the correcting ring is operated, the amount of out-of-focus is slight, and this is convenient.

I claim:

1. A microscope objective lens suitable for medium or high magnification having a great working distance and yet having an excellent imaging performance, comprising, in succession from the object side, a first lens group of positive refractive power for converting a light flux from an object into a convergent light flux, said first lens group having at least one positive meniscus lens component having its concave surface facing the object side and a cemented lens component, a second lens group having a cemented lens component of small refractive power disposed in said convergent light flux, and a third lens group having a meniscus lens component having its convex surface facing the object side and a succeeding negative lens component, said objective lens satisfying the following conditions:

$$|r_1| > |r_2| > f \quad (1)$$

$$3f > \tfrac{1}{2}|r_1| > d_1 \quad (2)$$

$$d_F + d_A > d_R \quad (3)$$

where $r_1$ and $r_2$ are the radii of curvature of the object side and image side lens surfaces, respectively, of the positive meniscus lens component in said first lens group which is most adjacent to the object side, $d_1$ is the center thickness of said positive meniscus lens component, f is the focal length of the entire system, $d_F$ is the center thickness of the meniscus lens component in said third lens group which has its convex surface facing the object side, $d_R$ is the center thickness of said negative lens component, and $d_A$ is the air space between said meniscus lens component and said negative lens component.

2. A microscope objective lens according to claim 1, wherein said third lens group receives light flux from said second lens group including a paraxial ray from the on-axis object point which enters said third lens group and which emerges from said third lens group, and wherein the height of said paraxial ray from the on-axis object point which emerges from said third lens group is in the range of ¼ to ½ relative to the height at which the paraxial ray enters said third lens group.

3. A microscope objective lens according to claim 1, wherein the meniscus lens component in said third lens group which has its convex surface facing the object side has a cemented surface having its convex surface facing the image side, and the negative lens component in said third lens group has on its object side a lens surface having its concave surface facing the object side.

4. A microscope objective lens according to claim 3, wherein said second lens group has a cemented component comprising a negative meniscus lens convex toward the object side, a biconvex positive lens and a negative lens.

5. A microscope objective lens according to claim 4, wherein numerical data are as follows:

| | Focal length f = 1.0   N.A. = 0.7 Magnification 60   $d_0$ = 1.77360 | | | | |
|---|---|---|---|---|---|
| No. | r | d | nd | ν | |
| 1 | −3.2947 | 0.8020 | 1.62254 | 53.07 | |
| 2 | −1.8908 | 0.0086 | | | |
| 3 | −32.1403 | 0.7877 | 1.49805 | 82.32 | G1 |
| 4 | −3.7418 | 0.0086 | | | |
| 5 | 6.0714 | 0.5442 | 1.75716 | 31.71 | |
| 6 | 3.3514 | 1.8619 | 1.43388 | 95.57 | |
| 7 | −4.8696 | 0.0286 | | | |
| 8 | 6.5873 | 0.2864 | 1.75031 | 35.26 | |
| 9 | 2.9229 | 1.7187 | 1.43388 | 95.57 | G2 |
| 10 | −3.4367 | 0.2864 | 1.61705 | 54.13 | |
| 11 | −18.1066 | 0.0086 | | | |
| 12 | 2.3409 | 1.7616 | 1.49805 | 82.32 | |
| 13 | −19.1940 | 0.3724 | 1.71763 | 48.03 | |
| 14 | 3.7356 | 2.7785 | | | G3 |
| 15 | −1.2321 | 0.7161 | 1.74868 | 52.36 | |
| 16 | 3.3732 | 0.4297 | 1.74127 | 27.66 | |
| 17 | −3.3732 | | | | | where the left-hand numbers represent the order from the object side, r represents the radius of curvature of each lens surface, d represents the center thickness and air space of each lens, nd represents the refractive index of each lens for d-line (λ=587.6 nm), ν represents the Abbe number of each lens, and $d_0$ represents the distance between the object surface and the vertex of the foremost lens surface.

6. A microscope objective lens according to claim 4, wherein numerical data are as follows:

| | Focal length f = 1.0   N.A. = 0.7 Magnification 60   $d_0$ = 1.84572 | | | | |
|---|---|---|---|---|---|
| No. | r | d | nd | ν | |
| 1 | −3.5289 | 0.7072 | 1.52359 | 65.12 | |
| 2 | −1.9368 | 0.0144 | | | |
| 3 | −20.3731 | 0.6929 | 1.49782 | 82.28 | |
| 4 | −3.7730 | 0.0144 | | | G1 |
| 5 | 28.1836 | 0.6374 | 1.49782 | 82.28 | |
| 6 | −6.9326 | 0.0135 | | | |
| 7 | 12.4790 | 0.2591 | 1.74950 | 35.19 | |
| 8 | 3.9457 | 1.5581 | 1.43388 | 95.57 | |
| 9 | −5.0967 | 0.0086 | | | |
| 10 | 6.2046 | 0.1710 | 1.74590 | 43.12 | |
| 11 | 3.2435 | 1.6908 | 1.43388 | 95.57 | G2 |
| 12 | −4.2575 | 0.2036 | 1.74443 | 49.46 | |
| 13 | −11.5554 | 0.0146 | | | |
| 14 | 2.4378 | 2.6760 | 1.49782 | 82.28 | |
| 15 | −5.3823 | 0.3221 | 1.61266 | 44.40 | |
| 16 | 1.3344 | 2.2086 | | | G3 |
| 17 | −1.5760 | 0.3360 | 1.71300 | 53.97 | |
| 18 | 4.4631 | 0.4336 | 1.78934 | 26.26 | |
| 19 | −3.2816 | | | | | where the left-hand numbers represent the order from the object side, r represents the radius of curvature of each lens surface, d represents the center thickness and air space of each lens, nd represents the refractive index of each lens for d-line (λ=587.6 nm), ν represents the Abbe number of each lens, and $d_0$ represents the distance between the object surface and the vertex of the foremost lens surface.

7. A microscope objective lens according to claim 4, wherein numerical data are as follows:

| | Focal length f = 1.0   N.A. = 0.9 Magnification 100   $d_0$ = 0.75002 | | | | |
|---|---|---|---|---|---|
| No. | r | d | nd | ν | |
| 1 | −3.0829 | 0.9782 | 1.74868 | 52.36 | |
| 2 | −1.6190 | 0.0245 | | | |
| 3 | −3.5948 | 0.9196 | 1.75471 | 27.66 | |
| 4 | 21.5169 | 2.2108 | 1.49805 | 82.32 | |
| 5 | −3.0604 | 0.0489 | | | G1 |
| 6 | 185.0551 | 2.1032 | 1.61420 | 30.73 | |
| 7 | −7.1415 | 0.0245 | | | |
| 8 | 10.6872 | 1.7951 | 1.75710 | 31.70 | |
| 9 | 4.5979 | 2.8858 | 1.43388 | 95.57 | |
| 10 | −8.6080 | 0.0245 | | | |
| 11 | 15.1363 | 0.9782 | 1.75031 | 35.26 | |
| 12 | 4.2152 | 2.9347 | 1.43388 | 95.57 | G2 |
| 13 | −4.1580 | 0.3913 | 1.48743 | 70.24 | |
| 14 | −20.4677 | 0.8755 | | | |
| 15 | 3.4756 | 4.4021 | 1.49805 | 82.32 | |
| 16 | −10.7367 | 1.2717 | 1.71356 | 53.98 | |
| 17 | 1.8403 | 0.5136 | | | G3 |
| 18 | −2.0436 | 0.4158 | 1.69758 | 55.72 | |
| 19 | 2.0436 | 0.6848 | 1.61400 | 30.72 | |
| 20 | −3.0819 | | | | | where the left-hand numbers represent the order from the object side, r represents the radius of curvature of each lens surface, d represents the center thickness and air space of each lens, nd represents the refractive index of each lens for d-line (λ=587.6 nm), ν represents the Abbe number of each lens, and $d_0$ represents the distance between the object surface and the vertex of the foremost lens surface.

* * * * *